(12) United States Patent
Kita (10) Patent No.: US 8,555,046 B2
(45) Date of Patent: Oct. 8, 2013

(54) COMPUTER SYSTEM AND ITS HW ABSTRACTION METHOD

(75) Inventor: Harutoshi Kita, Tokyo (JP)

(73) Assignee: NEC Corporation, Tokyo (JP)

( * ) Notice: Subject to any disclaimer, the term of this patent is extended or adjusted under 35 U.S.C. 154(b) by 296 days.

(21) Appl. No.: 13/034,915

(22) Filed: Feb. 25, 2011

(65) Prior Publication Data

US 2011/0219224 A1 Sep. 8, 2011

(30) Foreign Application Priority Data

Mar. 2, 2010 (JP) ................................. 2010-045326

(51) Int. Cl.
*G06F 1/28* (2006.01)

(52) U.S. Cl.
USPC ............................... 713/1; 713/100; 713/300

(58) Field of Classification Search
USPC .......................................... 713/1, 2, 100, 300
See application file for complete search history.

(56) References Cited

U.S. PATENT DOCUMENTS

| 7,475,238 | B1 * | 1/2009 | Yakovlev ...................... 713/100 |
| 2004/0030876 | A1 * | 2/2004 | Qureshi et al. .................... 713/1 |
| 2010/0162242 | A1 * | 6/2010 | Grouzdev ......................... 718/1 |

FOREIGN PATENT DOCUMENTS

| JP | 2004070945 A | 3/2004 |
| JP | 2004070952 A | 3/2004 |
| JP | 2004070953 A | 3/2004 |
| JP | 2004355620 A | 12/2004 |
| JP | 2005182779 A | 7/2005 |
| JP | 2006309754 A | 11/2006 |
| JP | 2009508183 A | 2/2009 |

OTHER PUBLICATIONS

Japanese Office Action for JP2010-045326 issued Dec. 19, 2011.

* cited by examiner

*Primary Examiner* — Paul Yanchus, III (57) ABSTRACT

A computer system includes an ACPI (Advanced Configuration and Power Interface) that abstracts HWs (hardwares) as objects arranged on an ACPI tree which is a virtual space, an OS (Operating System) that recognizes a configuration of the HW through the ACPI, a virtual HW provided between the ACPI and HW and includes a memory area in which locations storing information for each HW are arranged in the same arrangement as the objects on the ACPI tree, and a BIOS (Basic Input/Output System) that previously refers to the HW and stores information for each HW in the memory area of the virtual HW at a location corresponding to the HW. The ACPI refers not directly to the HW but to the memory area of the virtual HW to obtain information for each HW, thereby allowing the OS to recognize the HW configuration from the information for each HW.

10 Claims, 5 Drawing Sheets

COMPUTER SYSTEM AND ITS HW ABSTRACTION METHOD

This application is based upon and claims the benefit of priority from prior Japanese Patent Application No. 2010-045326, filed on Mar. 2, 2010, the disclosure of which is incorporated herein in its entirety by reference.

TECHNICAL FIELD

The present invention relates to a computer system and its HW (hardware) abstraction method.

BACKGROUND ART

There is known an ACPI (Advanced Configuration and Power Interface) as a standard technique for abstracting an HW constituting a computer, such as a CPU (Central Processing Unit) or memory. Abstracting the HW using the ACPI allows an OS (Operating System) such as Linux, Windows (registered trademark) and the like to boot on a platform of any vendor.

Specifically, the abstraction of the HW is performed by defining a tree-structured virtual space called an ACPI tree and describing the HW constituting a system on the ACPI tree as a device object. In the description of the ACPI Tree, a language called ASL (ACPI Source Language) is used. For objects corresponding to individual HWs, a method returning corresponding HW configuration information is described.

In general, when a method in the ACPI is described using the ASL, a configuration is employed in which information is read out from the HW and returned to an OS. Then, an ACPI driver on the OS executes the method in the ACPI, whereby the OS recognizes the HW configuration. That is, the OS recognizes the HW configuration through the ACPI. A procedure in which the ACPI makes the OS recognize the HW configuration is as follows.
(1) Method in ACPI refers to HW configuration and acquires data.
(2) Method-based processing is performed for data acquired by method in ACPI.
(3) Data created by method in ACPI is returned to OS.

However, the components that play a role of making the OS recognize the HW configuration in a conventional system are only the HW and ACPI. Further, unlike high-level languages such as C language, the ASL for use in description of the ACPI tree has limitations in the description of data definition or loop control, so the ASL is not suitable for description of a complicated control program and large-scale development. Thus, the conventional technique has the following problems.
(1) For large-scale server development, ASL development scale becomes large. This is because the number of the HWs on the ACPI tree is increased.
(2) For large-scale server development, development efficiency may be lowered to lead to quality degradation. This is because the ASL has limitations in the description of data definition or loop control.
(3) When the HW is modified or replaced by new one in the development of a new model, the ASL needs to be also rewritten to make assets reusing difficult. This is because the ACPI describes codes for referring to the HW using the ASL.
(4) There are inefficient aspects in supporting a multi-OS platform. This is because there may be a case where the ACPI driver on the OS cannot interpret ASL descriptions, so that the ASL needs to be described so as to allow all the OSes to interpret the ASL descriptions, thereby requiring preliminary studies.

(5) There is inconvenience in debugging. This is because debugging is generally performed on the OS in the conventional method in which the ACPI driver on the OS interprets the ASL. That is, if the OS cannot be booted, the ASL cannot be debugged.

In this connection, PTL 1 discloses a method of avoiding name collision in an ACPI control method. This method is executed by a computer for avoiding name collision in an ACPI control method and configured to acquire a first argument constituted by a unique identifier and prevent the use of the same identifier for different ACPI control methods, whereby the first argument is associated with a reserved name of an ACPI control method so as to avoid name collision to construct a unique identifier of a specific ACPI control method.

CITATION LIST

Patent Literature

{PTL 1} JP-A-2005-182779

SUMMARY OF INVENTION

Technical Problem

The abovementioned HW abstraction method based on the ACPI has the following problems.
(1) For large-scale server development, the number of the HWs on the ACPI tree is increased to increase ASL development scale, as well as, the above-mentioned ASL's limitations lowers development efficiency to lead to quality degradation.
(2) In an existing method in which the ASL considers directly the HW so as to abstract the HW, when the HW is modified or replaced by new one in the development of a new model, the ASL needs to be also rewritten to make assets reusing difficult.
(3) There may be a case where the ACPI driver on the OS cannot interpret ASL descriptions. In order to support a multi-OS platform, the ASL needs to be described so as to allow all the OSes to interpret the ASL descriptions, thereby requiring preliminary studies, which makes system operation inefficient.
(4) Since debugging is generally performed on the OS in this method in which the ACPI driver on the OS interprets the ASL, so that if the OS cannot be booted, the ASL cannot be debugged, which causes inconvenience in debugging.

The method disclosed in PTL 1 aims to avoid name collision in an ACPI control method but does not solve the problems as described above.

An exemplary object of the present invention is to provide a computer system and its HW abstraction method capable of reducing the ASL development scale, facilitating assets reusing, and facilitating multi-OS support.

Solution to Problem

According to a first exemplary aspect of the present invention, there is provided a computer system including: an ACPI (Advanced Configuration and Power Interface) that abstracts HWs (hardwares) as objects arranged on an ACPI tree which is a virtual space; an OS (Operating System) that recognizes a configuration of the HW through the ACPI; a virtual HW provided between the ACPI and HW and includes a memory area in which locations storing information for each HW are arranged in the same arrangement as the objects on the ACPI tree; and a BIOS (Basic Input/Output System) that previously refers to the HW and stores information for each HW in the memory area of the virtual HW at a location corresponding to the HW, wherein the ACPI refers not directly to the HW but to the memory area of the virtual HW to obtain information for each HW, thereby allowing the OS to recognize the HW configuration from the information for each HW.

According to a second exemplary aspect of the present invention, there is provided an HW abstraction method of a computer system, wherein an ACPI (Advanced Configuration and Power Interface) abstracts HWs (hardwares) as objects arranged on an ACPI tree which is a virtual space, a virtual HW including a memory area in which locations storing information for each HW are arranged in the same arrangement as the objects on the ACPI tree is provided between the ACPI and HW, a BIOS (Basic Input/Output System) previously refers to the HW and stores information for each HW in the memory area of the virtual HW at a location corresponding to the HW, and the ACPI refers not directly to the HW but to the memory area of the virtual HW to obtain information for each HW, thereby allowing an OS (Operating System) to recognize the HW configuration from the information for each HW.

Advantageous Effects of Invention

According to the present invention, there can be provided a computer system and its HW abstraction method capable of reducing the ASL development scale, facilitating assets reusing, and facilitating multi-OS support.

DESCRIPTION OF EMBODIMENTS

An exemplary embodiment of a computer system and its HW abstraction method according to the present invention will be described in detail below with reference to the accompanying drawings.

The present exemplary embodiment aims to achieve a configuration in which an ACPI method acquires data of the HW without directly referring to the HW for the purpose of improving development efficiency in a computer system including a large-scale multi-OS server and the like. That is, in the present exemplary embodiment, the ACPI does not directly refer to the HW, but a method (HW indirect reference type HW virtualizing/abstraction method) is adopted in which a virtual HW is provided between the ACPI and HW, a BIOS (Basic Input/Output System) previously stores data that the ACPI requires on the virtual HW, and the ACPI refers to the virtual HW. The adoption of this method allows improvement in efficiency of ACPI development and maintenance of quality at a predetermined satisfactory level, thereby facilitating responses to multi-OS and HW modification. Thus, for example, an ACPI-based HW indirect reference type HW virtualizing/abstraction method in the large-scale multi-OS server can be constructed.

The present exemplary embodiment adopts the following configurations.

(1) A virtual HW is newly provided between the ACPI and HW. The virtual HW has a memory area (in the example of FIG. 1, an HW configuration storage section) for storing data of the HW that each method on the ACPI side requires.

(2) A BIOS stores data in the virtual HW in the course of HW initialization at the system start-up time. Specifically, the BIOS virtually defines, in a data storage section such as a memory, elements of the HW in the same arrangement sequence as that of objects on the ACPI tree, creates the HW data that each method on the ACPI side requires, and stores the created HW data on the virtual HW.

(3) Each method on the ACPI side describes the ASL such that it refers not to the HW but to the virtual HW.

(4) When the ACPI driver on the OS executes each method on the ACPI side, the ACPI acquires information from the virtual HW and returns the information to the OS, and the OS recognizes the HW configuration through the virtual HW.

(5) When the HW configuration is dynamically modified during operation of the OS, the BIOS reflects the modification on the virtual HW to thereby allow the OS to recognize the modification of the HW configuration.

Figure 1:
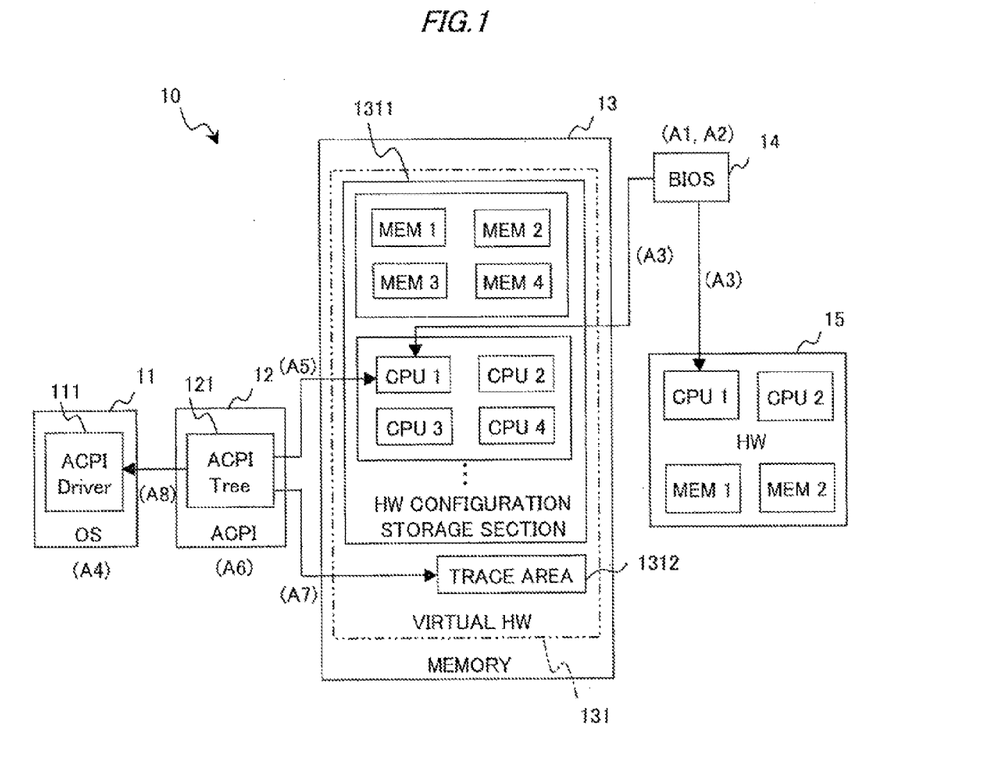
FIG. 1 A view illustrating the entire configuration of a computer system according to a first example of the present invention.

(6) A storage for debugging (memory area for debugging, which corresponds to a trace area in the example of FIG. 1) is provided in the virtual HW. When the virtual HW is referred to from the ACPI side, information such as a value given from the ACPI driver on the OS or value to be returned to the OS is stored in the storage for debugging as trace data.

Concrete examples of the present invention will be described below.

Example 1

Figure 2:
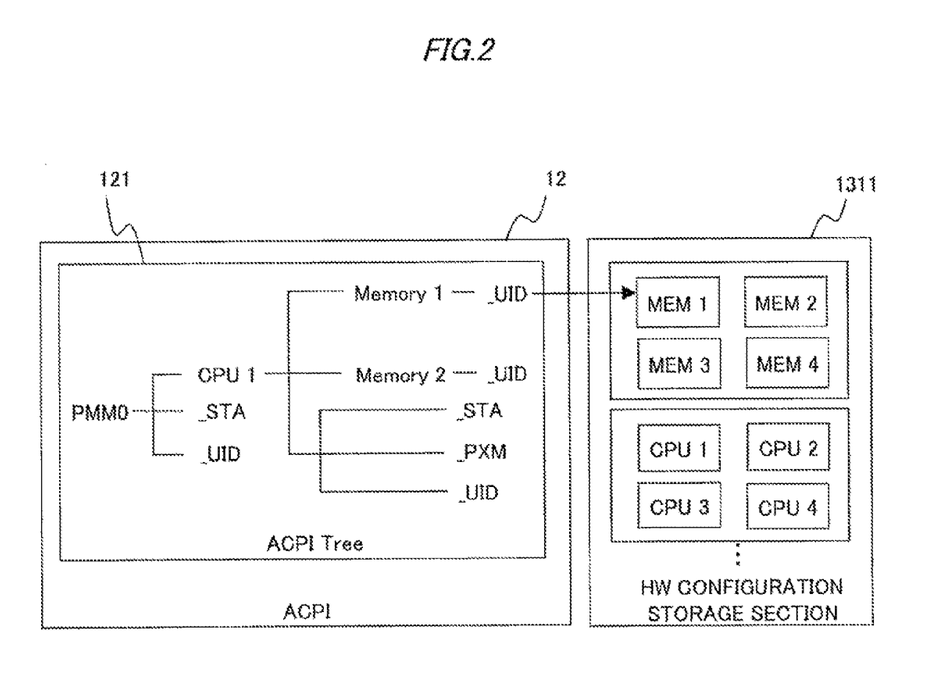
FIG. 2 A view illustrating details of an ACPI tree and an HW configuration storage section which are illustrated in FIG. 1.
Figure 3:
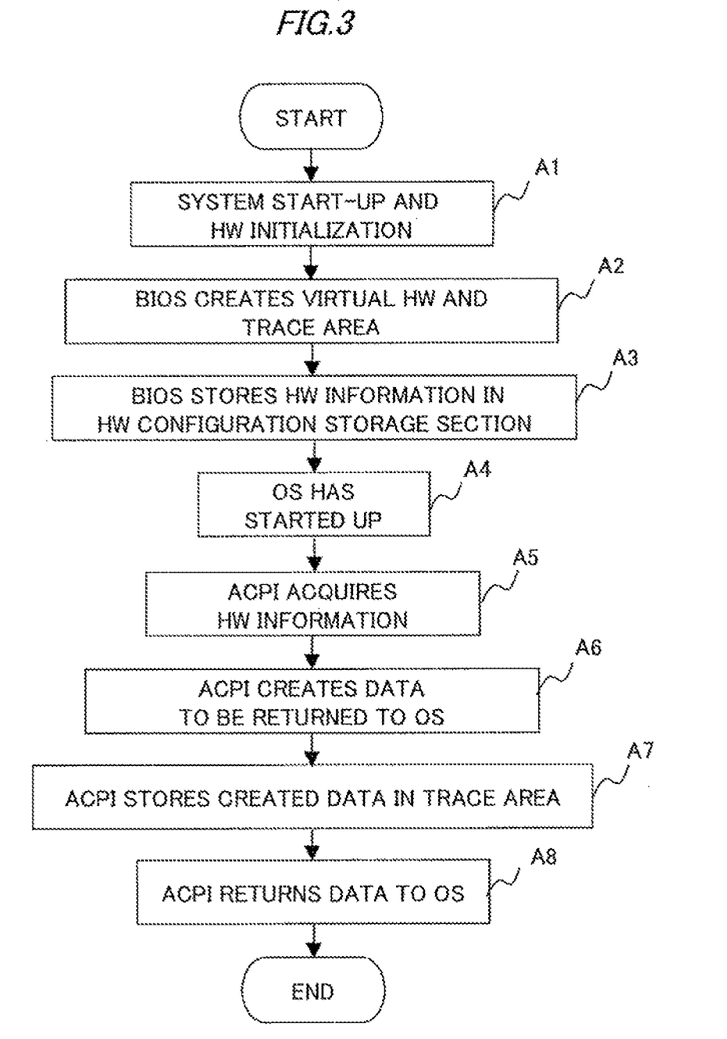
FIG. 3 A flowchart for explaining operation of the computer system illustrated in FIG. 1.

With reference to FIGS. 1 to 3, a first example of the present invention will be described.

FIG. 1 illustrates the entire configuration of the present example. As illustrated in FIG. 1, a computer system 10 according to the present example is realized by an HW and SW (software) which are based on computer architecture and has an OS 11, an ACPI 12, a memory 13, a BIOS 14, and an HW 15 such as a CPU. In the example of FIG. 1, CPUs 1 and 2 and MEMs (memories) 1 and 2 are illustrated as the HW 15. Functions (to be described later) of the SWs such as an OS 11 are realized by the CPU as the HW 15 executing the SWs.

The OS 11 has an ACPI driver 111 that executes the methods on the ACPI 12. The configuration of the ACPI driver 111 is a known one, so that a detailed description thereof will be omitted.

The ACPI 12 has an ACPI tree 121 which is a tree-structured virtual space described using the ASL. The HWs of the computer system 10 are abstracted on the ACPI tree 121 as corresponding device objects (hereinafter, referred to merely as "object"). A method returning information, etc. of an HW is described for each object corresponding to the HW.

A virtual HW 131 exists in the memory 13. The virtual HW 131 is constituted by an HW configuration storage section 1311 and a trace area 1312 serving as a memory area for debugging.

The virtual HW 131 is created in the memory 13 and stores HW configuration information of each HW. The HW configuration information defines the type, number, and capacity, etc.

At the planning stage by the developer, in which area of the memory 13 the area for the virtual HW 131 is allocated is determined.

The virtual HW 131 is realized by the following two means. The first means is a program for defining an address at which the HW configuration information is stored. The second means is a program for storing the HW configuration information obtained by referring to the HW 15 in the virtual HW 131. In the second program for storing the HW configuration information in the virtual HW 131, the storage order of the HW configuration information is defined such that the arrangement sequence of the HW configuration is the same as that of the objects on the ACPI tree 121 of the ACPI 12.

The above two programs are implemented in the BIOS 14. The BIOS 14 executes the programs to allocate the memory area in the memory 13 according to the description of the program for defining the address at which the HW configuration information is stored and to store obtained HW configuration information in a predetermined location in the virtual HW 131 by referring to the HW 15.

Further, at the planning stage by the developer, the ACPI 12 is designed so as to refer to the virtual HW 131. The ACPI 12 is developed by using the language called ASL (language describing ACPI tree). That is, the ACPI driver 111 existing in the OS 11 executes a method of each object on the ACPI tree 121 described using the ASL to allow the ACPI 12 to refer to the virtual HW 131 for obtaining the HW configuration information. Thereafter, the ACPI 12 gives the obtained HW configuration information to the OS 11 to allow the OS 11 to recognize the HW configuration information.

FIG. 2 illustrates details of the ACPI tree 121 and the HW configuration storage section 1311 in the virtual HW 131. As illustrated in FIG. 2, the ACPI tree 121 defines the HW 15 such as a CPU (in the example of FIG. 2, CPU 1, Memories 1 and 2, etc.) as objects. The objects each has a method such as UID (method returning ID uniquely assigned for each device).

When the ACPI driver 111 on the OS 11 executes the ASL, each methods in the ACPI 12 reads out information from the virtual HW 131 and returns the read out information to the OS 11.

The HW configuration storage section 1311 is a memory area provided in the virtual HW 131 and stores information for each HW 15 such as a CPU and a memory (MEM) (in the example of FIG. 1, CPUs 1, 2, 3, 4, and MEMs 1, 2, 3, 4).

The trace area 1312 is a memory area in which data required to be traced, such as data that the ACPI 12 returns to the OS 11.

Locations at which information (HW configuration information) for each HW 15 is stored are arranged in the HW configuration storage section 1311 in the order of ACPI numbers. Here, a description will be given of the ACPI numbers. The sequence numbers are assigned to the HWs 15 of the same type. As a design rule, different numbering systems are employed on the HW 15 and ACPI tree 121. The numbers assigned on the HW 15 are called "physical HW numbers", and numbers assigned on the ACPI tree 121 are called "ACPI numbers". As the physical HW numbers, numbers according to the arrangement on a substrate are assigned. As the ACPI numbers, numbers each obtained by adding a value of BMC (Base Management Controller) number or a master CPU (base CPU) number are assigned.

In the present example, the locations at which the information for each HW 15 is stored are arranged in the order of the ACPI numbers in the HW configuration storage section 1311, so that the order of the sequence numbers of the HW 15 is the same in both the ACPI tree 121 and HW configuration storage section 1311. That is, even when the modification of the HW 15 is made, the correspondence between the HW 15 in the ACPI tree 121 and HW 15 in the HW configuration storage section 1311 is not changed. Thus, the modification on the ACPI 12 side can be minimized, thereby facilitating assets reusing.

Next, with reference to FIG. 3, operation of the present example will be described in detail. A1 to A8 in FIG. 1 correspond to steps A1 to A8 in FIG. 3.

In the course of HW initialization (step A1) at the system start-up time, the BIOS 14 creates the virtual HW 131 constituted by the HW configuration storage section 1311 and trace area 1312 (step A2). After that, the BIOS 14 refers to HW information, such as type, number, and capacity of the HW 15, in the HW 15 and stores the HW information in the HW configuration storage section 1311 (step A3).

Subsequently, after the start-up of the OS 11 (step A4), the ACPI driver 111 on the OS 11 executes a method on the ACPI 12 side, and the method refers to the HW configuration storage section 1311 to obtain data in the HW configuration storage section 1311 (step A5). In this operation, for example, a function called "Operation Region" prepared in the ASL describing the method on the ACPI 12 side may be used. This function receives a given address and outputs data on the input address. In this case, addresses in the HW configuration storage section 1311 in which information are stored for each type of elements of the HW 15 have been set in the planning stage, so that by using Operation Region to designate a specific address in the HW configuration storage section 1311 at which desired information is stored, data on the specific address can be obtained.

The method in the ACPI 12 executes processing in the method for the obtained data and creates data to be returned to the OS 11 (step A6). The ACPI 12 stores the created data in the trace area 1312 in the virtual HW 131 for debugging (step A7). Then, the ACPI 12 returns the same data as that stored in the trance area 1312 to the OS 11 (step A8).

Thus, according to the present example, the following effects can be obtained.

The first effect is to reduce the ASL development scale. This is because the processing of referring to the virtual HW is simpler than the conventional processing of referring directly to the HW.

The second effect is to facilitate assets reusing. This is because the ACPI 12 refers to the virtual HW 131, so that even if the modification of the HW is made, the volume of the ASL to be rewritten can be reduced.

The third effect is to facilitate multi-OS support. This is because the ASL development scale is reduced, so that only a standard ASL that the ACPI driver can interpret suffices for description.

The fourth effect is to allow debugging to be performed on the ACPI side. This is because that when a memory is defined as the virtual HW storage, storage of data can be achieved.

Example 2

Next, with reference to FIGS. 4 and 5, a second example of the present invention will be described.

Figure 4:
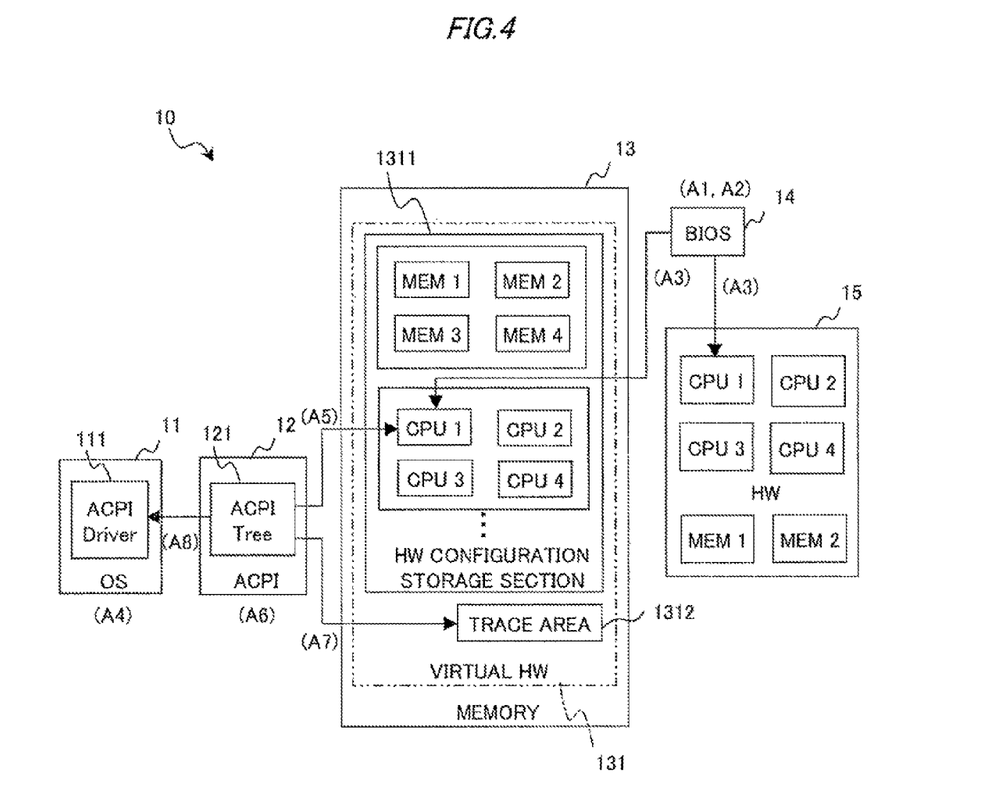
FIG. 4 A view illustrating the entire configuration of a computer system according to a second example of the present invention.

FIG. 4 illustrates the entire configuration of the present example. As illustrated in FIG. 4, the computer system 10 according to the present example differs from the computer system of FIG. 1 in that the HW 15 further includes CPUs 3 and 4. Processing of adding a CPU socket during runtime is referred to as "dynamic configuration control". The present invention functions also for the dynamic configuration control.

Here, it is assumed that the CPUs 3 and 4 are added to the HW 5 of FIG. 1 by the dynamic configuration control to make the configuration of FIG. 1 into the configuration of FIG. 4.

Figure 5:
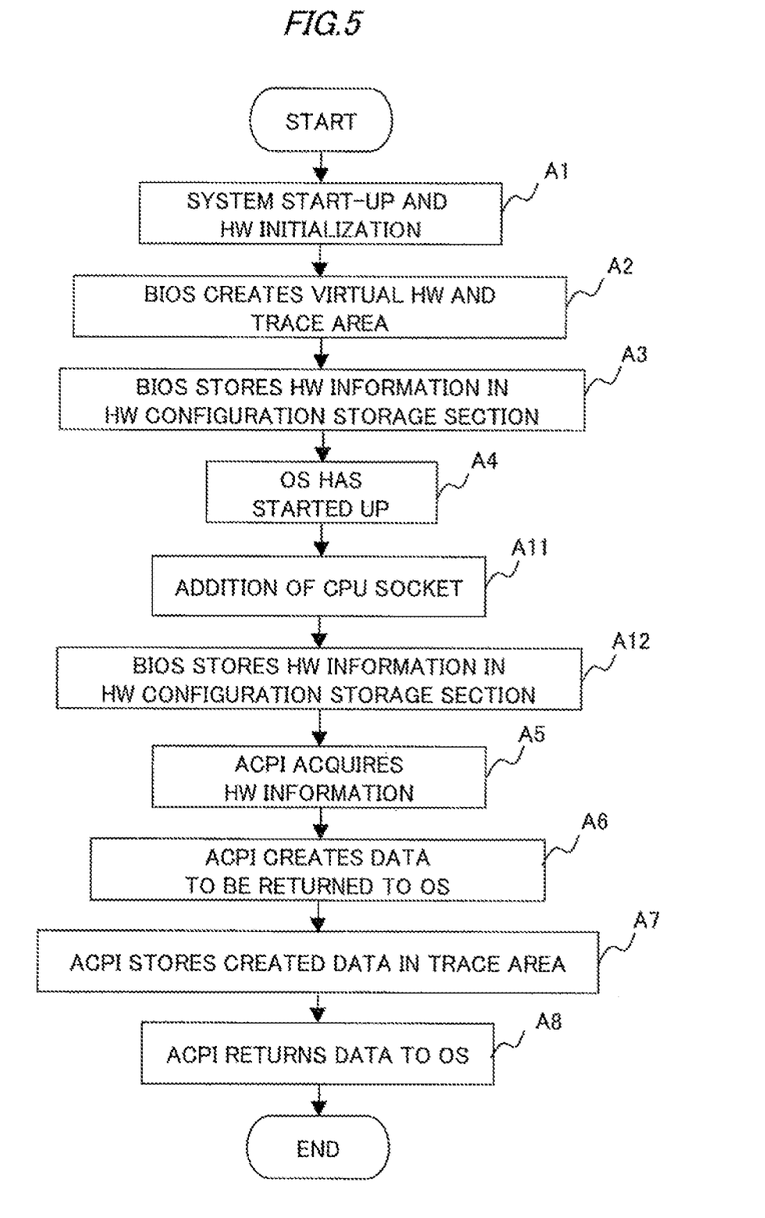
FIG. 5 A flowchart for explaining operation of the computer system illustrated in FIG. 4.

FIG. 5 illustrates operation steps of the dynamic control according to the present example. A1 to A8 in FIG. 4 correspond to steps A1 to A8 in FIG. 5. As illustrated in FIG. 5, steps A11 and A12 are newly added between the steps A4 and A5 of the operation steps of FIG. 3 to which the dynamic configuration control is not applied. The processing contents of steps A1 to A8 in FIG. 5 are the same as those of steps A1 to A8 of FIG. 3, so that only processing contents of steps A11 and A12 will be described.

After the start-up of the OS 11 (step A4), a CPU socket, etc., is added to the HW 5 in step A11 (dynamic configuration control).

Then, in step A12, the BIOS 14 refers to data in the HW 15 and stores the data in the HW configuration storage section 1311. The processing content of step A12 is the same as that of step A3. That is, when the steps (giving the HW configuration information to the virtual HW 131, ACPI 12, and OS 11 in this order) before the dynamic configuration control are performed once again after completion of the dynamic configuration control (step A11), it is possible to allow the present invention to function for the dynamic configuration control (i.e., it is possible to make the OS 11 recognize the HW configuration).

The computer system and its HW abstraction method according to the exemplary embodiment and examples may be realized by a hardware, a software, or a combination thereof. The configuration obtained in this case is not especially limited, but any configuration may be available for the present invention as long as it can realize the functions of the abovementioned components. For example, a configuration in which each component constitutes a individual circuit or a unit or a configuration in which a plurality of functions are integrated in a single circuit or unit may be adopted.

The whole or part of the exemplary embodiments disclosed above can be described as, but not limited to, the following supplementary notes.

(Supplementary note 1) A computer system comprising: an ACPI that abstracts HWs (hardwares) as objects arranged on an ACPI tree which is a virtual space; an OS that recognizes a configuration of the HW through the ACPI; a virtual HW provided between the ACPI and HW and includes a memory area in which locations storing information for each HW are arranged in the same arrangement as the objects on the ACPI tree; and a BIOS that previously refers to the HW and stores information for each HW in the memory area of the virtual HW at a location corresponding to the HW, wherein the ACPI refers not directly to the HW but to the memory area of the virtual HW to obtain information for each HW, thereby allowing the OS to recognize the HW configuration from the information for each HW.

(Supplementary note 2) The computer system according to supplementary note 1, wherein the memory area of the virtual HW is constructed by arranging locations storing information of the HW in the order of ACPI numbers assigned to the ACPI tree.

(Supplementary note 3) The computer system according to supplementary note 1 or 2, wherein the virtual HW further includes a memory area for debugging, and when the ACPI refers to the memory area of the virtual HW, data required for debugging on the ACPI side is stored in the memory area for debugging.

(Supplementary note 4) The computer system according to any one of supplementary notes 1 to 3, wherein the BIOS refers to the HW in the course of initialization of the HW and stores information for each HW in the memory area of the virtual HW at a location corresponding to the HW.

(Supplementary note 5) The computer system according to any one of supplementary notes 1 to 4, wherein, when the configuration of the HW is dynamically modified during operation of the OS, the BIOS reflects the modification of the HW configuration on the information for each HW stored in the memory area of the virtual HW at a location corresponding to the HW so as to allow the OS to recognize the modification of the HW configuration through the virtual HW.

(Supplementary note 6) An HW abstraction method of a computer system, wherein an ACPI abstracts HWs (hardwares) as objects arranged on an ACPI tree which is a virtual space, a virtual HW including a memory area in which locations storing information for each HW are arranged in the same arrangement as the objects on the ACPI tree is provided between the ACPI and HW, a BIOS previously refers to the HW and stores information for each HW in the memory area of the virtual HW at a location corresponding to the HW, and the ACPI refers not directly to the HW but to the memory area of the virtual HW to obtain information for each HW, thereby allowing an OS to recognize the HW configuration from the information for each HW.

(Supplementary note 7) The HW abstraction method according to claim 6, wherein the memory area of the virtual HW is constructed by arranging locations storing information of the HW in the order of ACPI numbers assigned to the ACPI tree.

(Supplementary note 8) The HW abstraction method according to supplementary note 6 or 7, wherein the virtual HW further includes a memory area for debugging, and when the ACPI refers to the memory area of the virtual HW, data required for debugging on the ACPI side is stored in the memory area for debugging.

(Supplementary note 9) The HW abstraction method according to any one of supplementary notes 6 to 8, wherein the BIOS refers to the HW in the course of initialization of the HW and stores information for each HW in the memory area of the virtual HW at a location corresponding to the I-1W.

(Supplementary note 10) The HW abstraction method according to any one of supplementary notes 6 to 9, wherein when the configuration of the HW is dynamically modified during operation of the OS, the BIOS reflects the modification of the HW configuration on the information for each HW stored in the memory area of the virtual HW at a location corresponding to the HW so as to allow the OS to recognize the modification of the HW configuration through the virtual HW.

Although the present invention has been described using the exemplary embodiment, the present invention is not limited to the above exemplary embodiment. Further, various modifications that can be appreciated by those skilled in the art may be made to the configuration or details of the present invention within the scope of the present invention.

INDUSTRIAL APPLICABILITY

As described above, the present invention may be applied to a computer system including a large-scale multi-OS server and the like using the HW abstraction method based on the ACPI.

REFERENCE SIGNS LIST

10: Computer system
11: OS
12: ACPI

13: Memory
14: BIOS
15: HW (hardware)
111: ACPI driver
121: ACPI tree
131: Virtual HW
1311: HW configuration storage section
1322: Trace area

The invention claimed is:

1. A computer system comprising:
an ACPI (Advanced Configuration and Power Interface) controller implemented at least in hardware and that abstracts HWs (hardwares) as objects arranged on an ACPI tree which is a virtual space;
an OS (Operating System) controller that recognizes a configuration of the HW through the ACPI;
a virtual HW memory that is provided between the ACPI controller and HW and includes a memory area in which locations storing information for each HW are arranged in the same arrangement as the objects on the ACPI tree; and
a BIOS (Basic Input/Output System) controller implemented at least in hardware that previously refers to the HW and stores information for each HW in the memory area of the virtual HW memory at a location corresponding to the HW, wherein
the ACPI controller refers not directly to the HW but to the memory area of the virtual HW memory to obtain information for each HW, thereby allowing the OS controller to recognize the HW configuration from the information for each HW.

2. The computer system according to claim 1, wherein the memory area of the virtual HW memory is constructed by arranging locations storing information of the HW in the order of ACPI numbers assigned to the ACPI tree.

3. The computer system according to claim 1, wherein the virtual HW memory further includes a memory area for debugging, and
when the ACPI controller refers to the memory area of the virtual HW memory, data required for debugging on the ACPI controller side is stored in the memory area for debugging.

4. The computer system according to claim 1, wherein the BIOS controller refers to the HW in the course of initialization of the HW and stores information for each HW in the memory area of the virtual HW memory at a location corresponding to the HW.

5. The computer system according to claim 1, wherein, when the configuration of the HW is dynamically modified during operation of the OS controller, the BIOS controller reflects the modification of the HW configuration on the information for each HW stored in the memory area of the virtual HW memory at a location corresponding to the HW so as to allow the OS controller to recognize the modification of the HW configuration through the virtual HW memory.

6. An HW abstraction method of a computer system, wherein
an ACPI (Advanced Configuration and Power Interface) abstracts HWs (hardwares) as objects arranged on an ACPI tree which is a virtual space,
a virtual HW including a memory area in which locations storing information for each HW are arranged in the same arrangement as the objects on the ACPI tree is provided between the ACPI and HW,
a BIOS (Basic Input/Output System) previously refers to the HW and stores information for each HW in the memory area of the virtual HW at a location corresponding to the HW, and
the ACPI refers not directly to the HW but to the memory area of the virtual HW to obtain information for each HW, thereby allowing an OS (Operating System) to recognize the HW configuration from the information for each HW.

7. The HW abstraction method according to claim 6, wherein
the memory area of the virtual HW is constructed by arranging locations storing information of the HW in the order of ACPI numbers assigned to the ACPI tree.

8. The HW abstraction method according to claim 6, wherein
the virtual HW further includes a memory area for debugging, and
when the ACPI refers to the memory area of the virtual HW, data required for debugging on the ACPI side is stored in the memory area for debugging.

9. The HW abstraction method according to claim 6, wherein
the BIOS refers to the HW in the course of initialization of the HW and stores information for each HW in the memory area of the virtual HW at a location corresponding to the HW.

10. The HW abstraction method according to claim 6, wherein
when the configuration of the HW is dynamically modified during operation of the OS, the BIOS reflects the modification of the HW configuration on the information for each HW stored in the memory area of the virtual HW at a location corresponding to the HW so as to allow the OS to recognize the modification of the HW configuration through the virtual HW.

* * * * *